J. E. CROOK.
TROLLEY WHEEL.
APPLICATION FILED FEB. 5, 1915.
1,167,631.
Patented Jan. 11, 1916.
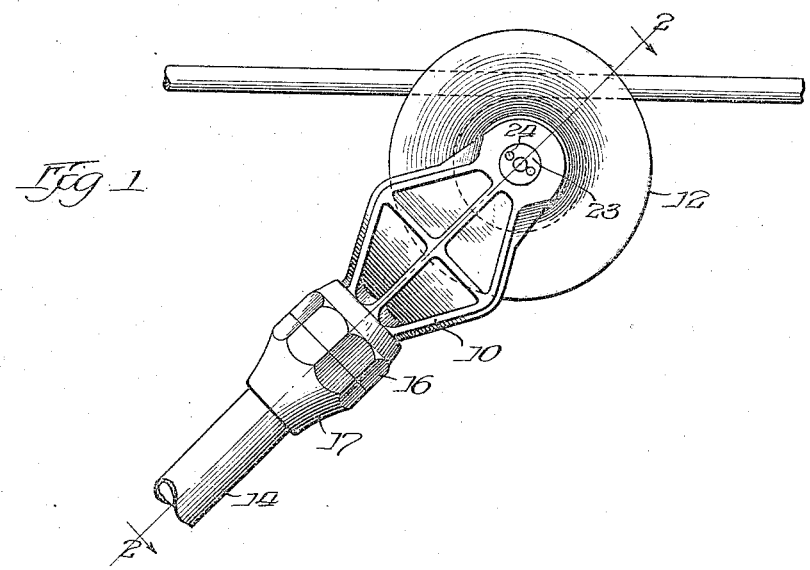
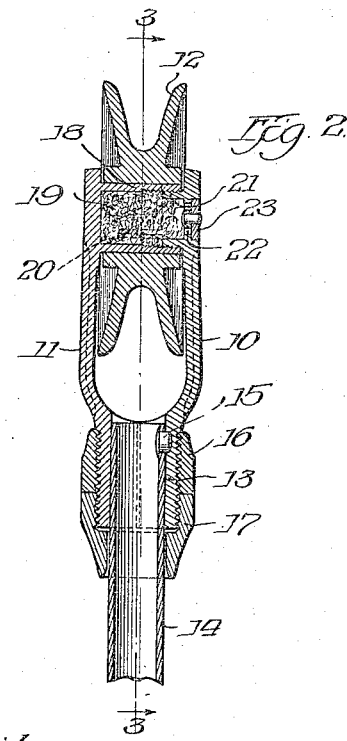
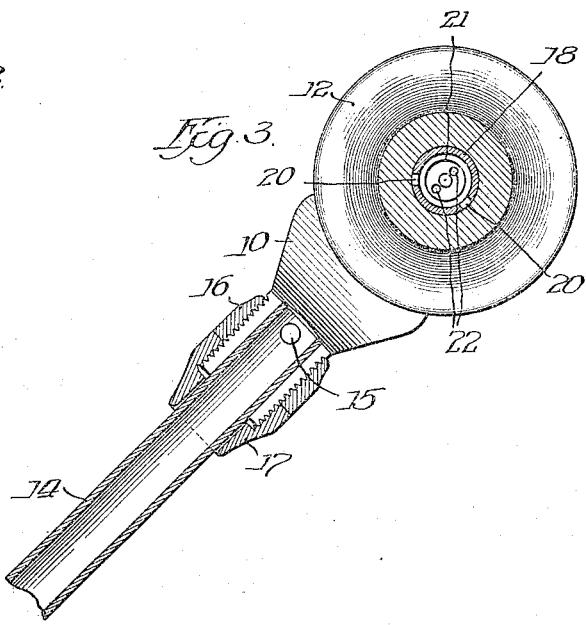
Witnesses:
Inventor
James E. Crook
By his Atty.

UNITED STATES PATENT OFFICE.

JAMES E. CROOK, OF CHICAGO, ILLINOIS.

TROLLEY-WHEEL.

1,167,631.  Specification of Letters Patent.  Patented Jan. 11, 1916.

Application filed February 5, 1915. Serial No. 6,235.

*To all whom it may concern:*

Be it known that I, JAMES E. CROOK, a citizen of the United States, and resident of Chicago, in the county of Cook and State of Illinois, have invented certain new and useful Improvements in Trolley-Wheels, of which the following is a specification.

My invention relates to trolley wheels for electric cars and has particular reference to a novel lubricating attachment for use in connection therewith.

It is well understood that trolley wheels are subjected to extreme service, first, because of their exposure to the elements, and second, because of the relatively-high speed at which the wheels revolve. This results in rapid wear, requiring that the wheels be renewed at comparatively short intervals. I have devised a mechanism for use in this relation, the parts being so constructed that the wheel is lubricated at all times; it may be readily replaced or examined when required, and is of simple and economical construction.

The invention will be more readily understood by reference to the accompanying drawings wherein:

Figure 1 is a side elevation of a trolley wheel made in accordance with my invention; Fig. 2 is a section on the line 2—2 of Fig. 1; and Fig. 3 is a section on the line 3—3 of Fig. 2.

Referring more particularly to the drawings it will be seen that my device includes a pair of arms 10, 11, associated together to form a yoke between which the trolley wheel 12 is mounted. The shank of each arm 10, 11 is semicircular and when in proper position forms a hollow tube 13 having threads on the exterior thereof. The trolley pole 14 is adapted to be inserted in the tube 13 and held in place by the coöperation of a lug 15 on the pole with a recess in the tube 13. There is sufficient play or clearance between the two arms 10, 11 to permit the insertion of the pole and the location of the lug 15. In order to securely hold the two halves of the tube 13 in place and to lock the pole therein, I have provided the nut 16 and lock nut 17. By this means the trolley wheel may be securely fastened onto the upper end of the pole and quickly removed when necessary. At the upper end of the arm 11 I provide a hollow stud 18 the outer surface of which acts as a bearing for the wheel 12. Within the hollow interior of the stud 18 I locate a quantity of fibrous material 19 such as felt, fine waste or any similar material which will retain a lubricating oil or grease. The bearing 18 is provided with a plurality of slots 20, as shown in Fig. 3 and in dotted lines in Fig. 2 through which the felt or waste projects and by means of which oil is supplied to the bearing surfaces on the wheel. The opening in the stud 18 is closed by a threaded plug 21 carried by the arm 10. To apply the plug the arm 10 is rotated bodily, the plug being thereby screwed into place. As means for providing oil without dismantling the parts I provide apertures 22 in the arm 10, which apertures are normally closed by means of a disk 23 which may be rotated to bring apertures 24 therein into register with the apertures 22.

A device constructed as described will be lubricated and therefore operate without excessive wear for a long period of time. The parts are exceedingly simple and can not become out of repair. After once being applied and the nuts 16, 17 secured in place, the axle and harp are a rigid part of the trolley pole.

Obviously my construction is capable of considerable modification, and such modifications as are within the scope of my claims I consider within the spirit of my invention.

I claim:

1. In a trolley harp, the combination of a pair of arms constituting a yoke, a trolley wheel between said arms, a hollow bearing carried by one of said arms and serving to support said wheel, and a threaded plug carried by the other arm and serving to close an open end of said hollow bearing, substantially as described.

2. In a trolley harp the combination of a pair of arms, a trolley wheel mounted between said arms, a hollow bearing carried by one of said arms, a plug carried by the other arm and acting to close the open end of said bearing, the shanks of said arms being circular and threaded upon their exterior, and a fastening nut coöperating with said combined shanks to fasten the same upon a trolley pole, substantially as described.

3. In a trolley harp the combination of a pair of arms, a hollow bearing member carried by one arm and a plug carried by the other arm, said hollow bearing being provided with a radial opening, a trolley wheel mounted upon said bearing, and means for supplying a lubricant to the interior of said bearing and retarding the escape of the same through the aperture to the bearing surfaces, substantially as described.

4. In a trolley harp the combination of a pair of arms, a hollow bearing carried by one arm and a threaded plug carried by the other arm, said bearing being provided with a slot, a wheel mounted upon said bearing, and fibrous material within the hollow bearing, substantially as described.

5. In a trolley harp, the combination of a shank constructed in two parts and arranged when combined to form a tube, an arm springing from each portion of said shank and adapted to accommodate a trolley wheel therebetween, one portion of said shank being provided with a recess, a trolley pole having a lug adapted to be accommodated within said recess and a nut for clamping said pole in place and rigidly securing the two halves of said shank, substantially as described.

6. In a trolley harp, the combination of a pair of arms having semi-cylindrical terminal portions, one of said arms having an integral hollow trunnion and the other of said arms having an integral stud adapted to project into said hollow trunnion, a trolley wheel adapted to be mounted on said trunnion, and means for securing said semi-cylindrical portions rigidly on a trolley pole, substantially as described.

JAMES E. CROOK.

Witnesses:
W. J. WARDE,
H. C. GARITALDE.

Copies of this patent may be obtained for five cents each, by addressing the "Commissioner of Patents, Washington, D. C."